Figure 1:
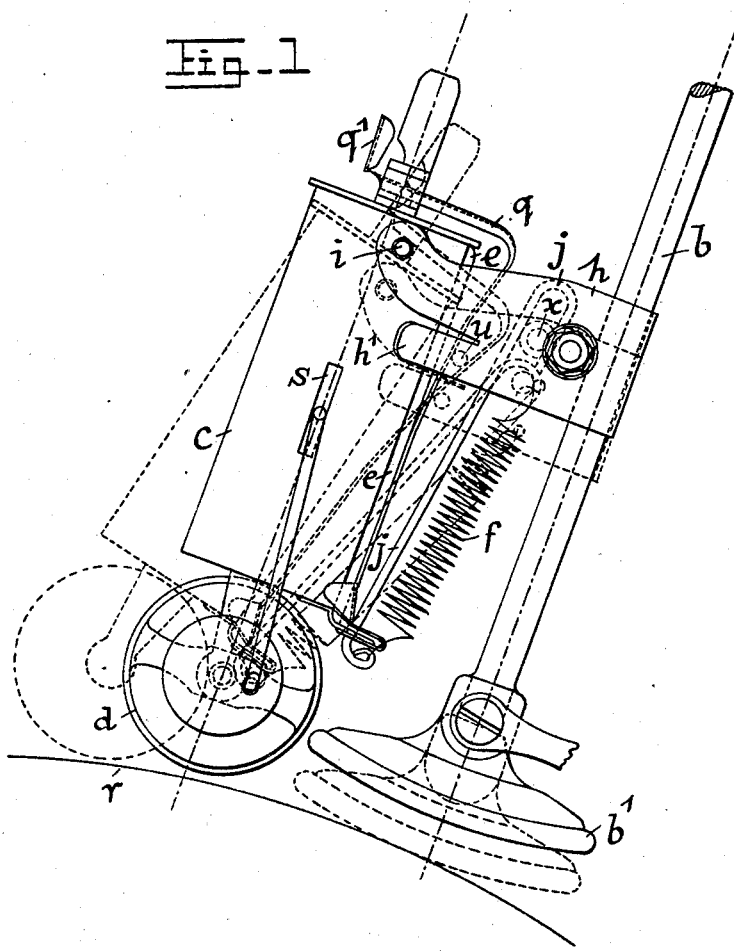

No. 679,825. Patented Aug. 6, 1901.
J. BLOMSTER & C. J. E. GUSTAFSSON.
ALARM APPARATUS FOR BICYCLES, &c.
(Application filed Apr. 20, 1901.)

(No Model.) 2 Sheets—Sheet 1.

Witnesses.

Inventors
Johan Blomster,
Carl Johan Edvard Gustafsson.
By
Attorneys.

No. 679,825. Patented Aug. 6, 1901.
J. BLOMSTER & C. J. E. GUSTAFSSON.
ALARM APPARATUS FOR BICYCLES, &c.
(Application filed Apr. 20, 1901.)
(No Model.) 2 Sheets—Sheet 2.
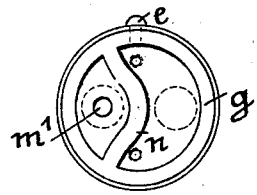
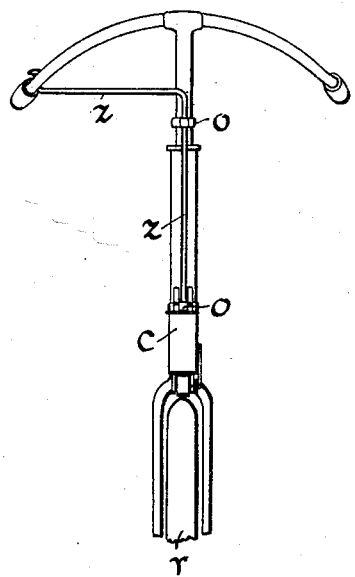
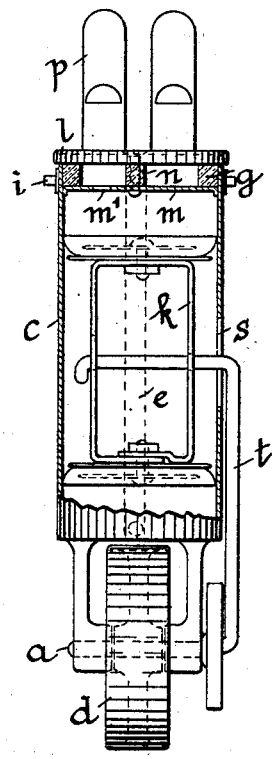
Witnesses
Inventors
Johan Blomster,
Carl Johan Edvard Gustafsson.
By
Attorneys

UNITED STATES PATENT OFFICE.

JOHAN BLOMSTER AND CARL JOHAN EDVARD GUSTAFSSON, OF BORÅS, SWEDEN; SAID BLOMSTER ASSIGNOR TO SAID GUSTAFSSON.

ALARM APPARATUS FOR BICYCLES, &c.

SPECIFICATION forming part of Letters Patent No. 679,825, dated August 6, 1901.

Application filed April 20, 1901. Serial No. 56,700. (No model.)

*To all whom it may concern:*

Be it known that we, JOHAN BLOMSTER and CARL JOHAN EDVARD GUSTAFSSON, of Borås, in the Kingdom of Sweden, have invented new and useful Improvements in Alarm Apparatus for Bicycles and the Like, of which the following is a specification.

The invention relates to alarm apparatus for bicycles and the like, consisting of whistles, in combination with a pump the piston of which is actuated from a wheel caused to rotate by contact with any of the wheels of the bicycle. From other apparatus having the same purpose this is thought to be of more suitable construction, whereby its function will be easy and reliable. It may be used in combination with a brake or without such combination.

In the drawings, Figure 1 is a side view of an apparatus fastened to the brake-rod and provided with means for stifling the alarm when using the brake. Fig. 2 is a plan view with the lid taken away and the place of the whistles indicated by dotted lines. Fig. 3 is a front partly-sectional view. Fig. 4 shows the apparatus connected to the handle-bar of the bicycle.

The apparatus consists of a pump-cylinder $c$ with piston $k$. The connecting-rod $t$ is L or U shaped, and its upper horizontal part enters a longitudinal slot $s$ in the side wall of the cylinder and is movably connected to the piston $k$, the lower part being movably connected to a crank or crank-disk fastened to the axle $a$, mounted in bearings beneath the cylinder $c$ and having a wheel $d$, which is to be brought in contact with the tire $r$ of the wheel of the bicycle when alarm is to be given. By placing the connecting-rod laterally to the cylinder, as shown, packing-boxes are evitated and the angle of oscillation is diminished, as the point of connection between the connecting-rod and the piston is more distanced from the axle $a$, the result being that the apparatus can be actuated by a very small power, and thus is not liable to get out of order. The chambers above and below the piston are connected each to a whistle $p$, so that the one whistle sounds when the piston moves down and the other when the piston moves upward. Both whistles are, however, placed at the same (upper) end of the cylinder $c$, and the upper part of said cylinder is, by an interior bottom $m$ and a partition $n$, provided between said bottom $m$ and the lid $l$, divided into two chambers, one for each of the whistles. The one of these chambers communicates by an opening $m'$ with the room above the piston. The other chamber is, by means of a channel $e$, provided on the side of the cylinder, connected to the room below the piston. The partition $n$ may consist of a part of the packing $g$ between the bottom $m$ and the lid $l$.

Referring now to Fig. 1, the apparatus is hinged on pivots $i$, extending from the sides of the cylinder $c$ and bearing in holes in a clamp $h$, fastened to the brake-rod $b$. The clamp is provided with laps $h'$, against which the cylinder $c$ is pressed by a spring $f$, connected to the cylinder $c$ and the clamp $h$ or rod $b$, so that the apparatus is held firmly in the position indicated by full lines. In this position the distance between the wheel $d$ and the tire $r$ is less than the distance between the brake-shoe $b'$ and said tire. When the rod $b$ is lightly pressed downward, so that only the wheel $d$, but not the shoe $b'$, comes in contact with the tire $r$, the alarm apparatus alone will work, but not the brake; but when the rod $b$ is more strongly pressed down the spring $f$ will yield, so that the apparatus turns forward into the position indicated by dotted lines, thus permitting the brake-shoe to come into contact with the tire $r$ and brake the machine. In this position the alarm is stifled by means of a spring-damper $q$, the lower end of which is fastened to the back side of the cylinder $c$, while the upper end is bent forward between the whistles and is provided with laps which suit the front side of the whistles. The damper $q$ tends to bear against the mouth of the whistles, and thus stifle the sounds; but when the apparatus is in the position indicated by full lines in Fig. 1 the damper rests against a stud $u$ or the like provided on the clamp $h$, so that the laps $q'$ of the damper are held a distance from the mouth of the whistles. In the position indicated by dotted lines the distance between the cylinder $c$ and the stud $u$ is enlarged, and the damper thereby is permitted to spring backward and close the mouth of the whistles. When the pressure on the brake-lever ceases and the apparatus thus is permitted to return into the first position, the damper comes again in contact with the stud $u$ and is thereby moved away from the whistles.

For hindering straining of the spring $f$ a hook $j$ is fastened to the cylinder. When the apparatus is turned forward, this hook catches a stud $x$ on the clamp $h$, and thus limits the turning.

It is obvious that the apparatus may be fastened to the brake-rod $b$ by other connections than the clamp $h$—for instance, by means of links, permitting the apparatus to move up and down relatively the rod—and the apparatus may be held in the proper position by two springs, the one acting upward and the other downward. Also in this instance a damper may be used.

As well known, some riders never wish to have any brake on their machines; but always they must have some alarm apparatus. In this instance the apparatus may be fastened to the lower part of a separate rod $z$, Fig. 4, preferably having the form of an angle or such like guided in eyelets $o$ or by means of links connected to the guiding-tube or inclosed within the latter, the upper part being placed near the one handle, so that the apparatus usually held in position by spring or springs will function when pressing the upper part down with the finger.

We claim—

In an apparatus of the character described, the combination with a cylinder, a wheel independently journaled below the same, a piston in the cylinder, a rod having a suitable connection with said wheel, at one end, its opposite angular armed end passing through one side of the cylinder, and connected to both sides of the said piston, and the separate chambers formed at the top portion of the cylinder, of the whistles mounted on the upper surface of said cylinder, and the dampers coacting with said whistles, substantially as and for the purpose specified.

In testimony whereof we have hereunto set our names in the presence of two subscribing witnesses.

JOHAN BLOMSTER.
CARL JOHAN EDVARD GUSTAFSSON.

Witnesses:
GVON FROCIGBAUGH,
A. BECKMAN.